(12) United States Patent
Torsner et al.

(10) Patent No.: US 8,687,619 B2
(45) Date of Patent: Apr. 1, 2014

(54) SYSTEM AND METHOD OF DOWNLINKING DATA TO AN UNSYNCHRONIZED USER EQUIPMENT IN A TELECOMMUNICATIONS NETWORK

(75) Inventors: Johan Torsner, Masaby (SE); Stefan Wager, Espoo (FI); Niklas Johansson, Sollentuna (SE); Riikka Susitaival, Helsinki (FI); Peter Moberg, Stockholm (SE); Magnus Lindstrom, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1296 days.

(21) Appl. No.: 12/432,961

(22) Filed: Apr. 30, 2009

(65) Prior Publication Data

US 2010/0111069 A1    May 6, 2010

Related U.S. Application Data

(60) Provisional application No. 61/111,092, filed on Nov. 4, 2008.

(51) Int. Cl.
*H04J 3/06* (2006.01)

(52) U.S. Cl.
USPC ........... 370/350; 370/329; 370/229; 370/335; 370/328

(58) Field of Classification Search
USPC .................. 370/312, 350, 329, 229, 335, 328
See application file for complete search history.

(56) References Cited

U.S. PATENT DOCUMENTS

| | | | |
|---|---|---|---|
| 6,678,249 B2 * | 1/2004 | Toskala et al. | 370/236 |
| 7,450,587 B2 * | 11/2008 | Gruhn et al. | 370/394 |
| 7,499,417 B2 * | 3/2009 | Kim et al. | 370/310 |
| 7,774,686 B2 * | 8/2010 | Ahn et al. | 714/776 |
| 7,979,769 B2 * | 7/2011 | Chun et al. | 714/748 |
| 7,996,744 B2 * | 8/2011 | Ojala et al. | 714/748 |
| 8,005,107 B2 * | 8/2011 | Suzuki et al. | 370/431 |
| 8,054,791 B2 * | 11/2011 | Vujcic | 370/329 |
| 8,165,035 B2 * | 4/2012 | Che et al. | 370/252 |
| 8,176,376 B2 * | 5/2012 | Cheng et al. | 714/748 |
| 8,208,416 B2 * | 6/2012 | Suzuki et al. | 370/310 |
| 8,239,721 B2 * | 8/2012 | Pelletier et al. | 714/749 |
| 8,248,973 B2 * | 8/2012 | Chiu | 370/280 |
| 8,281,204 B2 * | 10/2012 | Hu et al. | 714/749 |
| 2005/0078641 A1 * | 4/2005 | Kim | 370/335 |
| 2005/0079883 A1 * | 4/2005 | Khawand et al. | 455/502 |
| 2005/0201319 A1 * | 9/2005 | Lee et al. | 370/321 |
| 2007/0110064 A1 * | 5/2007 | Ohkubo et al. | 370/390 |
| 2007/0230394 A1 * | 10/2007 | Wang et al. | 370/328 |
| 2007/0283032 A1 * | 12/2007 | Kim et al. | 709/230 |
| 2008/0144561 A1 * | 6/2008 | Kaikkonen et al. | 370/315 |
| 2008/0313519 A1 * | 12/2008 | Tseng | 714/748 |
| 2009/0017810 A1 * | 1/2009 | Harsch | 455/418 |
| 2009/0046649 A1 * | 2/2009 | Gao et al. | 370/329 |
| 2009/0046650 A1 * | 2/2009 | Dalsgaard et al. | 370/329 |
| 2010/0085929 A1 * | 4/2010 | Harada et al. | 370/329 |

* cited by examiner

*Primary Examiner* — Ricky Ngo
*Assistant Examiner* — Dewanda Samuel

(57) ABSTRACT

A system, method and node of downlinking transmissions to an unsynchronized UE in a telecommunications network. The method begins by a node in the network requesting synchronization of the UE with the network. A first transmission of data is sent from the node to the UE prior to synchronization of the UE. The UE then synchronizes with the network by the UE performing a Random Access procedure with the node, thereby triggering a time alignment command from the node to the UE to synchronize the UE with the network. A second transmission of data is then sent from the node to the UE after the UE is synchronized. A response feedback message is sent to the node from the UE. The message is a cumulative feedback message of the first transmission of data and the second transmission of data. Thus, data may be transmitted prior to synchronization of the UE.

40 Claims, 7 Drawing Sheets

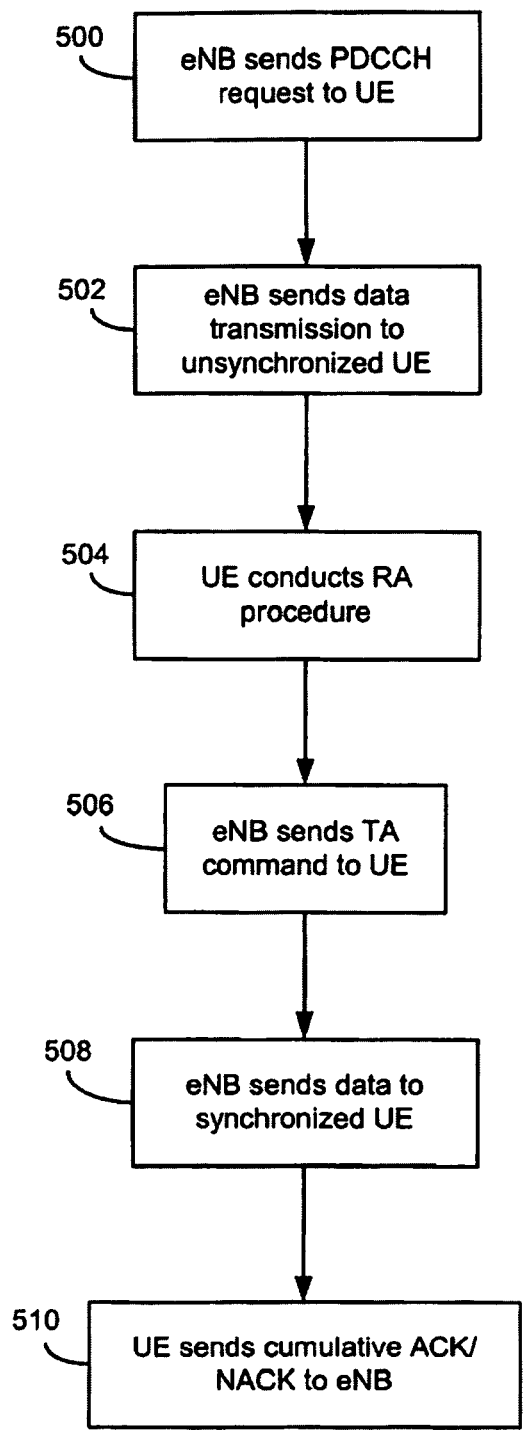

SYSTEM AND METHOD OF DOWNLINKING DATA TO AN UNSYNCHRONIZED USER EQUIPMENT IN A TELECOMMUNICATIONS NETWORK

CROSS-REFERENCE TO RELATED APPLICATIONS

This application claims the benefit of U.S. Provisional Application No. 61/111,092, filed Nov. 4, 2008, the disclosure of which is incorporated herein by reference.

BACKGROUND

The present invention relates to communications networks. More particularly, and not by way of limitation, the present invention is directed to a system and method of downloading data to an unsynchronized User Equipment (UE) in a telecommunications network. A key advantage in "Long Term Evolution (LTE) Advanced" is a decrease in user plane and control plane latency or delay. Third Generation Partnership Project (3GPP) is specified as a goal that special attention should be given in situations where the UE does not have a valid scheduling assignment and/or needs to synchronize to the network.

FIG. 1 illustrates a simplified block diagram of a UMTS network 100 that comprises a $3^{rd}$ Generation (3G) network referred to as a core network 102 and a UMTS Terrestrial Radio Access Network (UTRAN) 104. The UTRAN comprises a plurality of Radio Networks Controllers (RNCs) 106. There is a plurality of RNCs performing various roles. Each RNC is connected to a set of base stations. A base station is often called an Evolved Node B (eNB) 108. Each eNB 108 is responsible for communication with one or more UEs 110 within a given geographical cell 112. The serving RNC is responsible for routing user and signaling data between an eNB and the core network.

For a UE to transmit data in an Uplink (UL), the UE must be time synchronized to the network, otherwise the UE's transmissions may cause interference to other UE transmissions as well as receiving interference from other UEs. Synchronization is achieved by the eNB sending time alignment (TA) commands to the UE such that the UE can adjust its transmission timing. When the UE has not received any TA command for an extended period of time, a time alignment timer in the UE expires and the UE is considered not to be synchronized anymore. In order for the UE to start sending data when it is not synchronized, the UE must first perform a random access procedure, which is followed by a TA command sent by the eNB. When the UE has received the TA command (and a grant that allocates radio resources), the UE can then transmit its data in an uplink.

In principle, a UE can receive data in a Downlink (DL) without being time synchronized to the network. However, in this situation the UE cannot transmit any Hybrid Automatic Repeat Request (HARQ) feedback, such as Acknowledgements/Negative Acknowledgements (ACK/NACKs) since these messages require the UE to be synchronized. Thus, the normal operation for transmitting data to an unsynchronized UE involves several steps. FIG. 2 is a signaling diagram illustrating a typical sequence to transmit data to an unsynchronized UE 110. The network 100 first orders the UE 110 to perform a Random Access (RA) by sending a request 200 through the eNB 108 on a Physical Downlink Control Channel (PDCCH). The UE responds to the request by performing a RA procedure 202 which involves sending a random access preamble to the eNB. The request on the PDCCH includes an indication of which preamble the UE shall use when making the RA to avoid the need for a contention resolution handshake before DL transmission. The eNB can also choose not to indicate any dedicated preamble, in which case a contention resolution procedure is performed as part of the RA (which is not shown in FIG. 2). Next, the eNB responds by transmitting a TA command 204 to adjust the UE's transmission timing. After the TA command has been sent, the eNB can then start transmitting downlink data 206.

To minimize the user plane delay for unsynchronized UEs, it is possible to transmit data to these UEs, as long as HARQ is not used. However, this has the clear drawback that transmission losses cannot be recovered by HARQ. Instead, the losses must be recovered by Radio Link Control (RLC), which again increases the delay. One existing solution is to repeat the transmission blindly for a number of times to increase the reliability (e.g., the data can be transmitted 3 times). However, this procedure is inefficient since oftentimes only one or two transmissions are needed, or in other instances, sometimes three transmissions would not be enough. FIG. 3 is a signaling diagram of a blind HARQ transmission procedure to an unsynchronized UE. As depicted in FIG. 3, the eNB 109 sends an initial transmission 210 of data to the UE 110. Next, the eNB sends a first retransmission 212 of data to the UE. A second retransmission is then sent from the eNB to the UE.

SUMMARY

The present invention enables the downlinking of transmissions of data from a telecommunications network to an unsynchronized UE, while still enabling the use of HARQ.

In one aspect, the present invention is directed at a method of downlinking transmissions to an unsynchronized UE in a telecommunications network. The method begins by a node in the network requesting synchronization of the UE with the network. A first transmission of data is sent from the node to the UE prior to synchronization of the UE. The UE then synchronizes with the network by the UE performing a Random Access procedure with the node, thereby triggering a time alignment command from the node to the UE to synchronize the UE with the network. A second transmission of data is then sent from the node to the UE after the UE is synchronized. A response feedback message is sent to the node from the UE. The message is a cumulative feedback message of the first transmission of data and the second transmission of data. Thus, data may be transmitted prior to synchronization of the UE.

In another aspect, the present invention is directed at a system for downlinking transmissions to an unsynchronized UE in a telecommunications network. The system includes an unsynchronized UE operating in the telecommunicaitons network and a node communicating with the UE. The node requests synchronization of the UE with the network. The node sends a first transmission of data to the UE prior to synchronization of the UE. A synchronization of the UE with the network is then conducted. The node also sends a second transmission of data to the UE after the UE is synchronized. The UE sends a response feedback message to the node from the UE. The message is a cumulative feedback message of the first transmission of data and the second transmission of data.

In still another aspect, the present invention is directed at a node for downlinking transmissions to an unsynchronized UE in a telecommunications network. The node requests synchronization of an unsynchronized UE operating in the network. The node sends a first transmission of data to the UE prior to synchronization of the UE. The node synchronizes the UE with the network. In addition, the UE sends a second transmission of data to the UE after the UE is synchronized. The node receives a response feedback message to the node from the UE. The message is a cumulative feedback message of the first transmission of data and the second transmission of data. Thus, the node enables data to be transmitted prior to synchronization of the UE.

BRIEF DESCRIPTION OF THE DRAWINGS

In the following section, the invention will be described with reference to exemplary embodiments illustrated in the figures, in which:

FIG. 7 is a flow chart illustrating the steps of downlinking transmissions to an unsynchronized UE utilizing bundled ACK/NACK feedback according to the teachings of the present invention;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The present invention is a system and method of sending downlink data to unsynchronized UEs while still utilizing HARQ. In the present invention, similar to the normal operation discussed previously, the UE is requested by the eNB to perform a random access procedure in order to be able to time synchronize the UE to the network. This is achieved by transmitting a request on the PDCCH from the eNB to the UE. However, in the present invention, the eNB transmits downlink data before the UE is synchronized. Specifically, the data transmission may start directly after the PDCCH request has been sent. In another embodiment, the data may be sent prior to the transmission of the PDCCH request being sent. In another embodiment, the data transmission may be sent simultaneously with the PDCCH request.

In one embodiment, the eNB transmits one or more HARQ transmissions/retransmissions of the same Medium Access Control Protocol (MAC PDU) for a given HARQ process Identification. When the UE 110 has been synchronized to the network 100 and receives a HARQ retransmission for the same HARQ process, the retransmission is soft combined with the HARQ transmissions/retransmission that the UE received while not being synchronized. The UE then transmits an HARQ feedback message (ACK/NACK) that is a cumulative for all HARQ transmissions/retransmissions in the HARQ process. Thus, the HARQ feedback may be sent even if data is transmitted while the UE is not synchronized.

Figure 2:
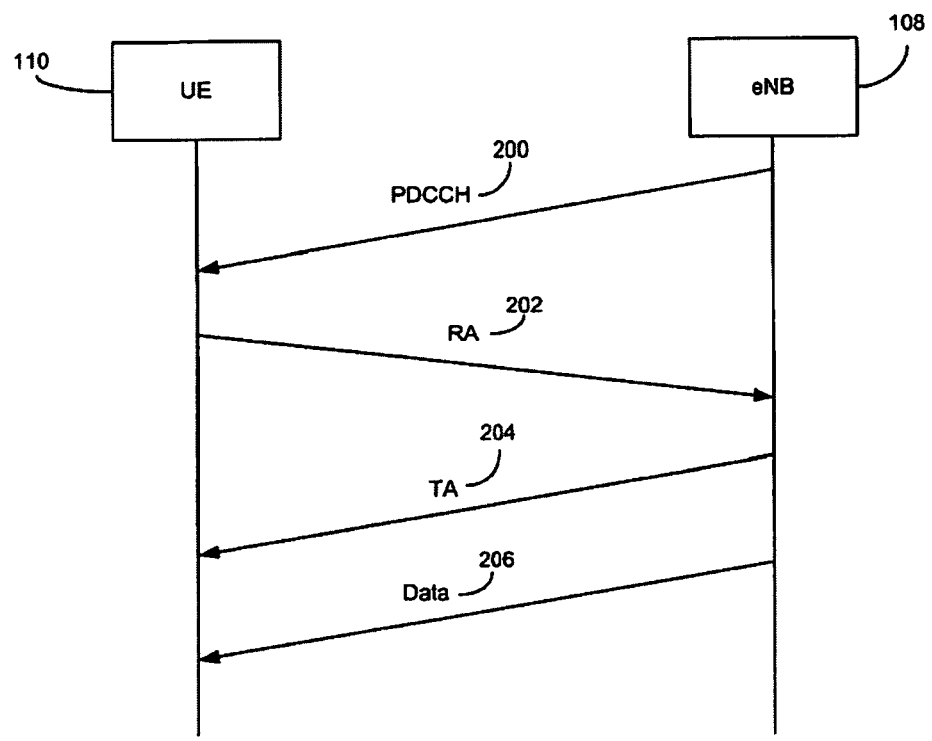
FIG. 2 (prior art) is a signaling diagram illustrating a typical sequence to transmit data to an unsynchronized UE.
Figure 3:
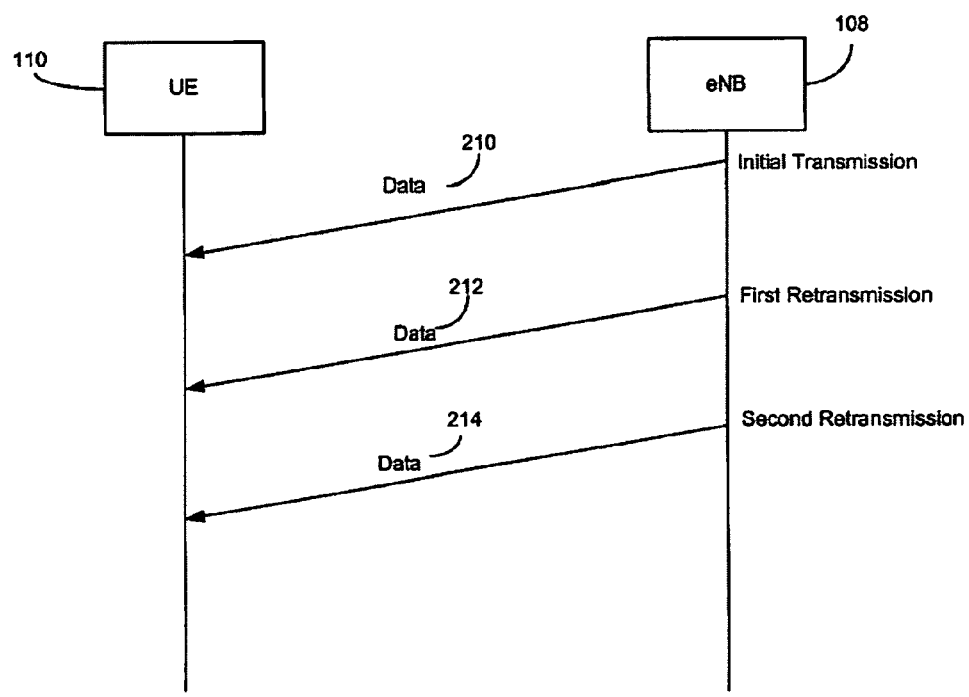
FIG. 3 (prior art) is a signaling diagram of a blind HARQ transmission procedure to an unsynchronized UE.
Figure 4:
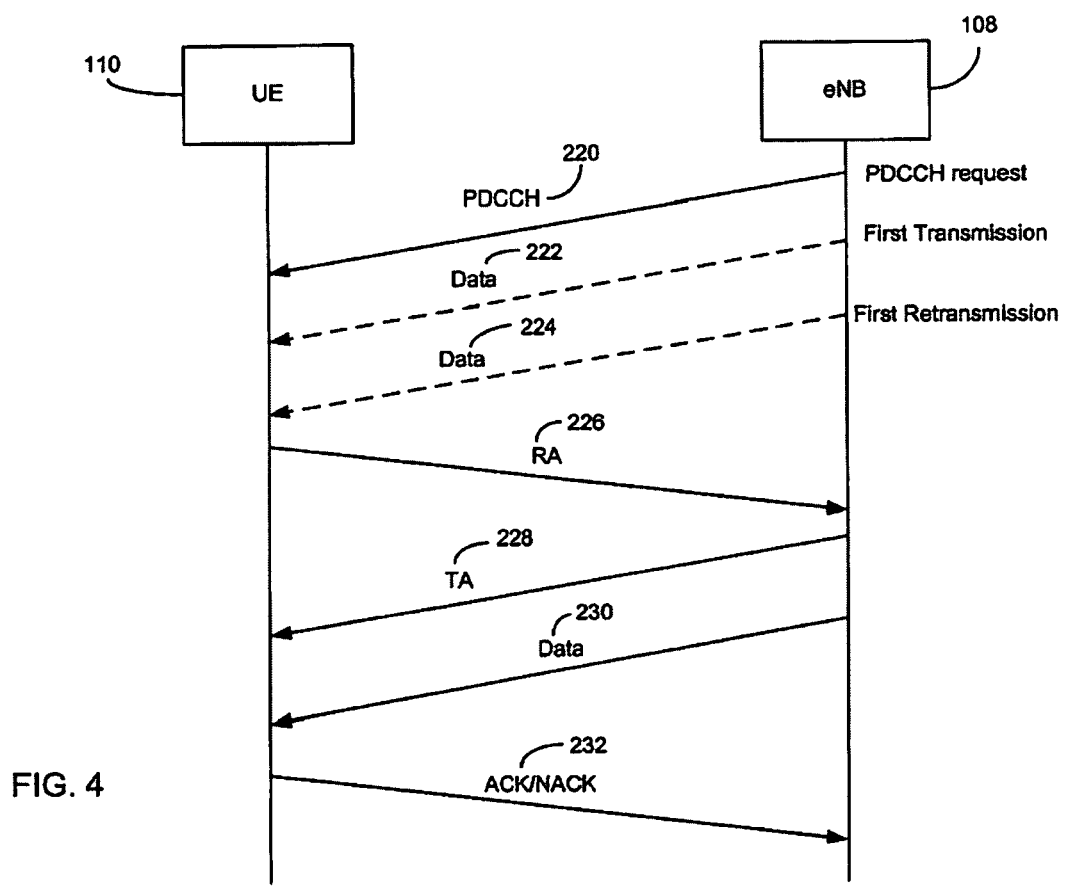
FIG. 4 is a signaling diagram illustrating a downlink transmission sequence to an unsynchronized UE in a first embodiment of the present invention.

FIG. 4 is a signaling diagram illustrating a downlink transmission sequence to an unsynchronized UE in a first embodiment of the present invention. In order to time synchronize with the network, a PCCCH request 220 to perform a random access is sent from the eNB 108 to the UE 110. The eNB sends one or more data transmissions/retransmissions of the same MAC PDU for a given HARQ process identification to the UE 110. As depicted in FIG. 4, the eNB sends a first transmission of data 222 and a first retransmission of data 224 to the UE. Both the first transmission and first retransmission are transmitted to the UE prior to synchronization. The UE responds to the request by performing a random access (RA) procedure 226 in a similar fashion described in FIG. 2. Next, the eNB responds by transmitting a TA command 228 to adjust the UE's transmission timing. The eNB may also transmit downlink data 230 (i.e., a retransmission with the HARQ retransmission for the same HARQ process) to the newly synchronized UE. The UE then transmits a HARQ feedback message (ACK/NACK) 232 that is a cumulative of all HARQ transmissions/retransmissions in the HARQ process. The cumulative ACK/NACK includes a cumulative response of first transmission 222, first retransmission 224 and the transmission 230.

It should be understood that although FIG. 4 describes transmissions associated in one HARQ process, the present invention may be implemented where the eNB transmits data in several, potentially all, HARQ processes while the UE is unsynchronized. When the UE is synchronized, the eNB may transmit a retransmission for each HARQ process where it has outstanding data, and thus, receives a HARQ feedback for each of these HARQ processes.

Figure 1:
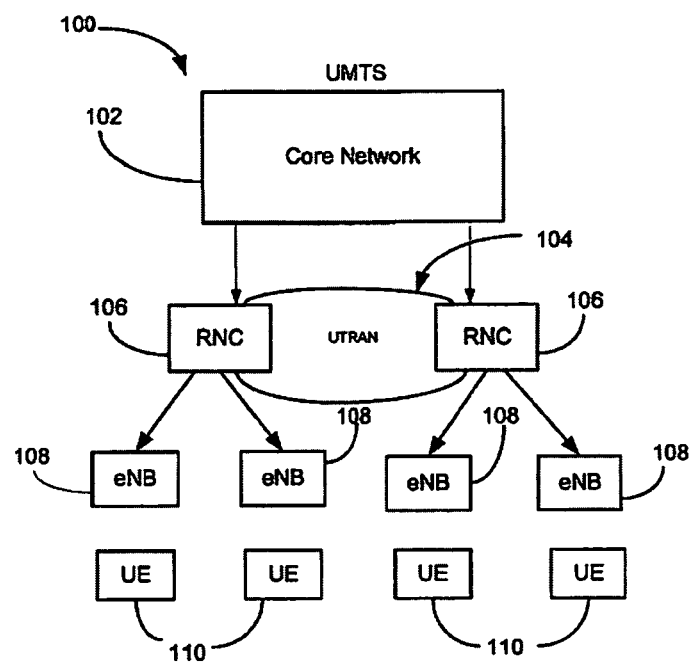
FIG. 1 (prior art) illustrates a simplified block diagram of an existing UMTS network.
Figure 5:
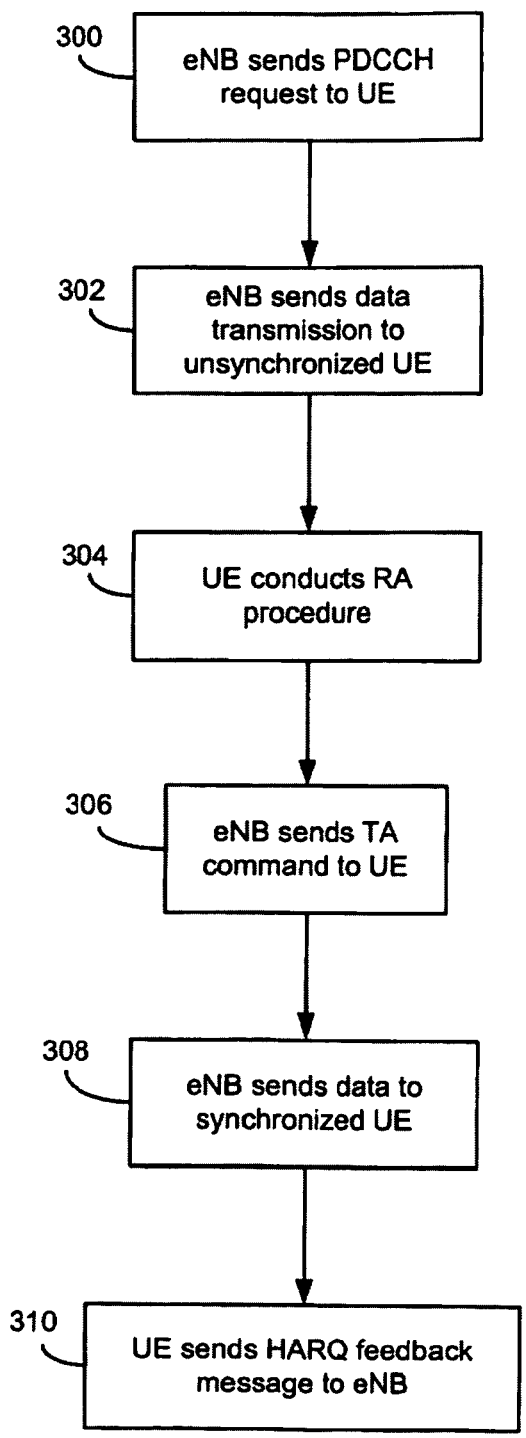
FIG. 5 is a flow chart illustrating the steps of downlinking transmissions to an unsynchronized UE according to the teachings of the present invention.

FIG. 5 is a flow chart illustrating the steps of downlinking transmissions to an unsynchronized UE according to the teachings of the present invention. With reference to FIGS. 1, 4 and 5, the method will now be explained. In step 300, a PCCCH request 220 is sent from the eNB 108 to the UE 110. Next, in step 302, the eNB sends one or more data transmissions/retransmissions of the same MAC PDU for a given HARQ process identification to the unsynchronized UE 110. As depicted in FIG. 4, the eNB sends a first transmission of data 222 and a first retransmission of data 224 to the UE. In step 304, the UE responds to the request by performing a RA procedure 226. Next, in step 306, the eNB responds by transmitting a TA command 228 to adjust the UE's transmission timing. In addition, in step 308, the eNB transmits downlink data 230 (i.e., a retransmission with the HARQ retransmission for the same HARQ process) to the newly synchronized UE. In turn, the UE then transmits a HARQ feedback message (ACK/NACK) 232 that is an accumulation of all HARQ transmissions/retransmissions in the HARQ process in step 310. The cumulative ACK/NACK includes a cumulative response of first transmission 222, first retransmission 224 and the transmission 230.

In another embodiment, the present invention may utilize HARQ ACK/NACK bundling known from Long Term Evolution Time Division Duplex (LTE TDD). In this embodiment, the UE is synchronized in a similar fashion as described in FIG. 4. However, when the UE is synchronized and has received one or several HARQ transmissions for data in different HARQ processes, the UE transmits a bundled ACK/NACK. A NACK is sent when the UE has received any data that cannot be decoded. Otherwise, an ACK is sent which cumulatively acknowledges all data over several HARQ processes.

Figure 6:
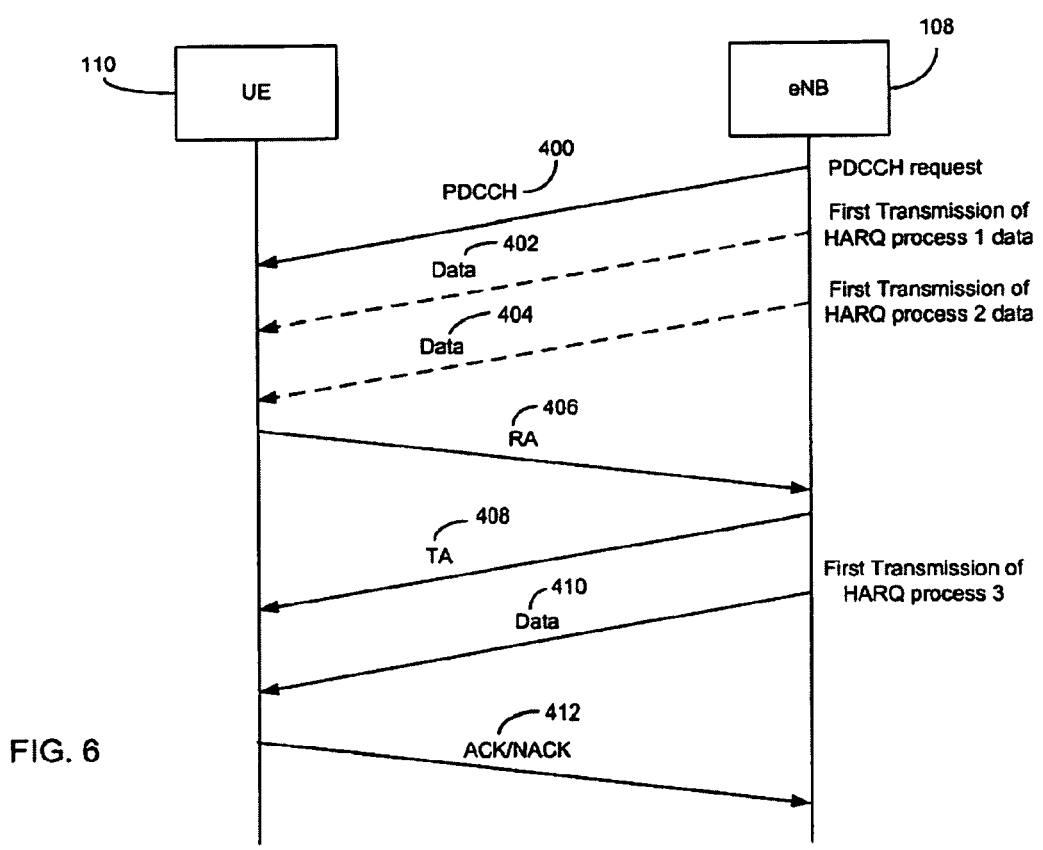
FIG. 6 is a signaling diagram illustrating a downlink transmission sequence to an unsynchronized UE utilizing bundled ACK/NACK feedback according in a second embodiment of the present invention.

FIG. 6 is a signaling diagram illustrating a downlink transmission sequence to an unsynchronized UE utilizing bundled ACK/NACK feedback according in a second embodiment of the present invention. As discussed in FIG. 4, In order to time synchronize with the network, a PCCCH request 400 to perform a random access is sent from the eNB 108 to the UE 110. The eNB sends one or more data transmissions/retransmissions to the UE 110. As depicted in FIG. 6, the eNB sends a first transmission of an HARQ process 1 data 402 and a first transmission of HARQ process 2 data 404 to the UE. Both of these transmissions are sent to the UE prior to synchronization. The UE responds to the request by performing a RA procedure 406 in a similar fashion described in FIG. 4. Next, the eNB responds by transmitting a TA command 408 to adjust the UE's transmission timing. The eNB may also transmit a first transmission of HARQ process 3 data 410 to the newly synchronized UE. The UE then transmits a HARQ feedback message (ACK/NACK) 412 that is a cumulative ACK/NACK of transmissions 402, 404, and 410 which cumulatively acknowledges all data over several HARQ processes.

FIG. 7 is a flow chart illustrating the steps of downlinking transmissions to an unsynchronized UE utilizing bundled ACK/NACK feedback according to the teachings of the present invention. With reference to FIGS. 1, 6 and 7, the method will now be explained. In step 500, a PCCCH request 400 is sent from the eNB 108 to the UE 110. Next, in step 502, the eNB sends one or more data transmissions/retransmissions to the unsynchronized UE 110. As depicted in FIG. 6, the eNB sends a first transmission of an HARQ process 1 data 402 and a first transmission of HARQ process 2 data 404 to the UE. In step 504, the UE responds to the request by performing a RA procedure 406. Next, in step 506, the eNB responds by transmitting a TA command 408 to adjust the UE's transmission timing. In addition, in step 508, the eNB transmits a first transmission of HARQ process 3 data 410 to the newly synchronized UE. In turn, the UE then transmits a HARQ feedback message (ACK/NACK) 412 that is a cumulative ACK/NACK of transmissions 402, 404, and 412 in step 510.

The present invention provides a significant reduction in time delay. The time between the reception of the PDCCH request in the UE until the UE is synchronized includes waiting for an RA opportunity and processing delays in the UE and eNB. The time may be in the order of 15 milliseconds (ms). With the normal sequence shown in FIG. 1, the eNB must wait approximately 15 ms before transmitting the first transmission of the data. The ACK/NACK is received 4 ms after the data transmission. Therefore, the total time until a first transmission is acknowledged by HARQ is approximately 19 ms. With the present invention, data is transmitted immediately after the PDCCH request. Alternatively, the data may be transmitted even before the PDCCH request. During the time the UE synchronizes itself, the eNB may transmit additional HARQ retransmissions if desirable. When the UE has been synchronized, the eNB sends an additional HARQ retransmission and receives an ACK/NACK which is an accumulation for the performed HARQ transmissions/retransmissions. Table 1 provides the time delay until data is received in the UE with a varying number of required HAR transmissions.

TABLE 1

| Method | HARQ transmissions needed | | |
|---|---|---|---|
| | 1 | 2 | 4 |
| Typical sequence | 15 ms | 23 ms | 39 ms |
| Blind Tx * 3 | 1 ms | 9 ms | Data lost |
| Sequence according to invention | 1 ms | 9 ms | 25 ms |

Table 1 provides an estimate of the delay needed with varying numbers of HARQ transmissions until data is correctly received in the UE. It should be noted that because the exact values vary depending on processing time and other assumptions, the table is exemplary only. It is evident that blind transmissions have a very low delay when the performed number of HARQ transmissions is large enough. In the cases where more than three transmissions are needed, the data is lost in HARQ since there is no HARQ feedback to indicate the lack of successful reception. If RLC Acknowledged Mode (AM) is used, RLC can recover the loss. However, this process takes significantly more time. It should also be noted that with blind retransmissions, many unnecessary retransmissions may be performed in the cases where one or two HARQ transmissions are sufficient for successful reception. The present invention combines low time delay with the robustness of a HARQ protocol and efficient usage of resource.

In an alternate embodiment of the present invention, in addition to the general case of sending data to unsynchronized UEs, the present invention may also be used to reduce the handover interruption time. At handover, a RA procedure to a target cell is performed and the target eNB may transmit data to the UE directly after a RA is received, rather than waiting for the UE to be synchronized. It is sufficient that the UE is synchronized when it is time for the UE to send the HARQ ACK/NACK. It should also be understood that the present invention may be used in any type of network and is not limited to the network and messages described herein.

The present invention provides many advantages over existing systems. The present invention provides low delay for transmission of downlink data to unsynchronized data while maintaining the robustness of HARQ.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. A method of downlinking transmissions to an unsynchronized user equipment (UE) in a telecommunications network, the method comprising:
   requesting synchronization of the UE by a node in the network;
   sending a first transmission of a first packet data unit (PDU) from the node to the UE prior to synchronization of the UE;
   conducting a synchronization of the UE with the network;
   sending a second transmission of the first PDU to the UE from the node after the UE is synchronized; and
   sending a response feedback message to the node from the UE, the message being a cumulative feedback message of the first transmission of the first PDU occurring before the synchronization of the UE and the second transmission of the first PDU occurring after the synchronization of the UE.

2. The method according to claim 1 wherein the node is an Evolved Node B.

3. The method according to claim 1 wherein requesting synchronization of the UE includes sending a request message over a Physical Downlink Control Channel from the node to the UE.

4. The method according to claim 1 wherein conducting a synchronization of the UE includes:
performing a Random Access procedure by the UE with the node; and
sending a time alignment command from the node to the UE to synchronize the UE with the network.

5. The method according to claim 1 wherein the feedback message is a Hybrid Automatic Repeat Request (HARQ) feedback message.

6. The method according to claim 5 wherein the feedback message is a cumulative Acknowledgement/Negative Acknowledgement (ACK/NACK) message of the first and second transmissions of the PDU.

7. The method according to claim 5 further comprising sending a third transmission of the PDU prior to synchronization of the UE, wherein the first and third transmissions of the PDU are associated with a first HARQ process.

8. The method according to claim 7 wherein;
the second transmission of the PDU is a retransmission of the first transmission of the PDU and associated with the first HARQ process; and
the feedback message soft combines the second transmission of the PDU with the first and third transmissions of the PDU.

9. The method according to claim 8 wherein the third transmission of the PDU is a retransmission of the first transmission of the PDU.

10. The method according to claim 5 further comprising sending a third transmission of the PDU prior to synchronization of the UE, wherein the first transmission of the PDU is associated with a first HARQ process and the third transmission of the PDU is associated with a second HARQ process.

11. The method according to claim 10 wherein sending a response feedback message includes sending a separate feedback message for each HARQ process.

12. The method according to claim 10 wherein the second transmission of the PDU is associated with a third HARQ process.

13. The method according to claim 12 wherein the feedback message is a cumulative response to the first, second and third transmissions of the PDU.

14. The method according to claim 13 wherein the cumulative response is a bundled Acknowledgement/Negative Acknowledgement (ACK/NACK) message.

15. The method according to claim 1 wherein the method is implemented during a handover of the UE from the node to a second node.

16. A system for downlinking transmissions to an unsynchronized user equipment (UE) in a telecommunications network, the system comprising:
an unsynchronized UE configured to operate in the telecommunications network;
a node adapted for communicating with the UE, the node being configured to:
request synchronization of the UE with the network;
send a first transmission of a first packet data unit (PDU) to the UE prior to synchronization of the UE;
conduct a synchronization of the UE with the network;
send a second transmission of the first PDU to the UE after the UE is synchronized; and
wherein the UE is further configured to send a response feedback message to the node, the message being a cumulative feedback message of the first transmission of the first PDU occurring before the synchronization of the UE and the second transmission of the first PDU occurring after the synchronization of the UE.

17. The system according to claim 16 wherein the node is an Evolved Node B.

18. The system according to claim 16 wherein the node is configured to request synchronization of the UE by sending a request message over a Physical Downlink Control Channel from the node to the UE.

19. The system according to claim 16 wherein the node is configured to conduct a synchronization of the UE by:
performing a Random Access procedure by the UE with the node; and
sending a time alignment command from the node to the UE to synchronize the UE with the network.

20. The system according to claim 16 wherein the feedback message is a Hybrid Automatic Repeat Request (HARQ) feedback message.

21. The system according to claim 20 wherein the feedback message is a cumulative Acknowledgement/Negative Acknowledgement (ACK/NACK) message of the first and second transmissions of the PDU.

22. The system according to claim 20 wherein the node is further configured to send a third transmission of the PDU prior to synchronization of the UE, wherein the first and third transmissions of the PDU are associated with a first HARQ process.

23. The system according to claim 22 wherein;
the second transmission of the PDU is a retransmission of the first transmission of the PDU and associated with the first HARQ process; and
the feedback message soft combines the second transmission of data with the first and third transmissions of the PDU.

24. The system according to claim 23 wherein the third transmission of the PDU is a retransmission of the first transmission of the PDU.

25. The system according to claim 20 wherein the node is further configured to send a third transmission of the PDU prior to synchronization of the UE, wherein the first transmission of the PDU is associated with a first HARQ process and the third transmission of the PDU is associated with a second HARQ process.

26. The system according to claim 25 wherein the node is further configured to send a response feedback message by sending a separate feedback message for each HARQ process.

27. The system according to claim 25 wherein the second transmission of data is associated with a third HARQ process.

28. The system according to claim 27 wherein the feedback message is a cumulative response to the first, second and third transmissions of the PDU.

29. The system according to claim 28 wherein the cumulative response is a bundled Acknowledgement/Negative Acknowledgement (ACK/NACK) message.

30. A node for downlinking transmissions to an unsynchronized user equipment (UE) in a telecommunications network, wherein the node is configured to:
request synchronization of an unsynchronized UE operating in the network;
send a first transmission of a first packet data unit (PDU) to the UE prior to synchronization of the UE;

conduct a synchronization of the UE with the network;

send a second transmission of the first PDU to the UE after the UE is synchronized; and receive a response feedback message to the node from the UE, the message being a cumulative feedback message of the first transmission of the first PDU occurring before the synchronization of the UE and the second transmission of the first PDU occurring after the synchronization of the UE.

31. The node according to claim 30 wherein the node is an Evolved Node B.

32. The node according to claim 30 wherein the node is configured to request synchronization of the UE by sending a request message over a Physical Downlink Control Channel from the node to the UE.

33. The node according to claim 30 wherein the node is configured to conduct a synchronization of the UE by sending a time alignment command from the node to the UE to synchronize the UE with the network.

34. The node according to claim 30 wherein the node is further configured to send a third transmission of the PDU prior to synchronization of the UE, wherein the first and third transmissions of the PDU are associated with a first Hybrid Automatic Repeat Request (HARQ) process.

35. The node according to claim 34 wherein;
the second transmission of data is a retransmission of the first transmission of the PDU and associated with the first HARQ process; and
the feedback message soft combines the second transmission of the PDU with the first and third transmissions of the PDU.

36. The node according to claim 35 wherein the third transmission of the PDU is a retransmission of the first transmission of the PDU.

37. The node according to claim 30 wherein the node is further configured to send a third transmission of the PDU prior to synchronization of the UE, wherein the first transmission of the PDU is associated with a first Hybrid Automatic Repeat Request (HARQ) process and the third transmission of the PDU is associated with a second HARQ process.

38. The node according to claim 37 wherein the second transmission of the PDU is associated with a third HARQ process.

39. The node according to claim 37 wherein the feedback message is a cumulative response to the first, second and third transmissions of the PDU.

40. The node according to claim 39 wherein the cumulative response is a bundled Acknowledgement/Negative Acknowledgement (ACK/NACK) message.

* * * * *

UNITED STATES PATENT AND TRADEMARK OFFICE
CERTIFICATE OF CORRECTION

PATENT NO. : 8,687,619 B2
APPLICATION NO. : 12/432961
DATED : April 1, 2014
INVENTOR(S) : Torsner et al.

It is certified that error appears in the above-identified patent and that said Letters Patent is hereby corrected as shown below:

In the Specification

In Column 2, Line 52, delete "telecommunicaitons" and insert -- telecommunications --, therefor.

In Column 3, Line 33, delete "invention;" and insert -- invention. --, therefor.

In Column 4, Line 6, delete "PCCCH" and insert -- PDCCH --, therefor.

In Column 4, Line 39, delete "PCCCH" and insert -- PDCCH --, therefor.

In Column 5, Line 6, delete "PCCCH" and insert -- PDCCH --, therefor.

In Column 5, Line 30, delete "PCCCH" and insert -- PDCCH --, therefor.

In the Claims

In Column 7, Line 27, in Claim 8, delete "wherein;" and insert -- wherein: --, therefor.

In Column 8, Line 33, in Claim 23, delete "wherein;" and insert -- wherein: --, therefor.

In Column 10, Line 1, in Claim 35, delete "wherein;" and insert -- wherein: --, therefor.

Signed and Sealed this
Second Day of September, 2014

Michelle K. Lee
*Deputy Director of the United States Patent and Trademark Office*